(12) United States Patent
Brokenshire et al.

(10) Patent No.: US 7,472,261 B2
(45) Date of Patent: Dec. 30, 2008

(54) METHOD FOR PERFORMING EXTERNALLY ASSISTED CALLS IN A HETEROGENEOUS PROCESSING COMPLEX

(75) Inventors: Daniel A. Brokenshire, Round Rock, TX (US); Mark R. Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 11/269,290

(22) Filed: Nov. 8, 2005

(65) Prior Publication Data

US 2007/0104204 A1    May 10, 2007

(51) Int. Cl.
G06F 7/00    (2006.01)
(52) U.S. Cl. .................... 712/233; 709/208; 709/213
(58) Field of Classification Search ............ 709/201, 709/208, 213; 712/233
See application file for complete search history.

(56) References Cited

U.S. PATENT DOCUMENTS

| | | | | |
|---|---|---|---|---|
| 4,683,549 | A * | 7/1987 | Takaki .................... | 712/244 |
| 5,142,683 | A * | 8/1992 | Burkhardt et al. .......... | 709/215 |
| 5,146,593 | A | 9/1992 | Brandle et al. | |
| 5,463,735 | A * | 10/1995 | Pascucci et al. ............ | 709/222 |
| 5,615,263 | A * | 3/1997 | Takahashi ................. | 713/164 |
| 5,630,059 | A * | 5/1997 | Brady et al. ............... | 709/217 |
| 5,901,309 | A * | 5/1999 | Hammer et al. ............ | 712/244 |
| 6,032,186 | A * | 2/2000 | Hernandez et al. ......... | 709/227 |
| 6,032,244 | A * | 2/2000 | Moudgill ................... | 712/23 |
| 6,233,613 | B1 * | 5/2001 | Walker et al. .............. | 709/224 |
| 6,308,223 | B1 * | 10/2001 | Opgenoorth ............... | 709/248 |
| 6,321,323 | B1 | 11/2001 | Nugroho et al. | |
| 6,424,627 | B1 * | 7/2002 | Sørhaug et al. ............ | 370/241 |
| 6,633,564 | B1 * | 10/2003 | Steer et al. ................. | 370/389 |

(Continued)

FOREIGN PATENT DOCUMENTS

CA    1 233 258    2/1988

(Continued)

OTHER PUBLICATIONS

Kahle, J. A., "Introduction to the Cell multiprocessor", IBM Corporation, IBM Journal of Research and Development, vol. 49, No. 4-5, Jul./Sep. 2005, pp. 589-604.

(Continued)

*Primary Examiner*—David Y Eng
(74) *Attorney, Agent, or Firm*—Stephen J. Walder, Jr.; Matthew Talpis (57) ABSTRACT

A method is provided for accessing, by an application running on a first processor, operating system services from an operating system running on a second processor by performing an assisted call. A data plane processor first constructs a parameter area based on the input and output parameters for the function that requires control processor assistance. The current values for the input parameters are copied into the parameter area. An assisted call message is generated based on a combination of a pointer to the parameter area and a specific library function opcode for the library function that is being called. The assisted call message is placed into the processor's stack immediately following a stop-and-signal instruction. The control plane processor is signaled to perform the library function corresponding to the opcode on behalf of the data plane processor by executing a stop and signal instruction.

1 Claim, 7 Drawing Sheets

U.S. PATENT DOCUMENTS

| | | | |
|---|---|---|---|
| 6,662,297 B1 * | 12/2003 | Boom et al. | 712/245 |
| 6,704,863 B1 * | 3/2004 | Paul et al. | 712/244 |
| 6,738,850 B2 * | 5/2004 | Lai et al. | 710/266 |
| 6,895,460 B2 * | 5/2005 | Desoli et al. | 710/262 |
| 7,016,968 B2 * | 3/2006 | Willner et al. | 709/231 |
| 7,076,558 B1 * | 7/2006 | Dunn | 709/229 |
| 7,203,758 B2 * | 4/2007 | Cook et al. | 709/231 |
| 7,213,137 B2 * | 5/2007 | Boom et al. | 712/245 |
| 7,278,014 B2 * | 10/2007 | Erb | 712/244 |
| 7,281,120 B2 * | 10/2007 | Dieffenderfer et al. | 712/219 |
| 7,290,050 B1 * | 10/2007 | Smith et al. | 709/224 |

FOREIGN PATENT DOCUMENTS

| | | |
|---|---|---|
| EP | 0 174 231 A1 | 3/1986 |
| EP | 0 387 172 A2 | 9/1990 |
| JP | 02-272627 | 11/1990 |

OTHER PUBLICATIONS

"Cell Broadband Engine Architecture, Version 1.0", IBM Corporation, Aug. 8, 2005, www-128.ibm.com/developerworks/power/cell/, pp. 1-319.

"Synergistic Processor Unit Instruction Set Architecture, Version 1.0", IBM Corporation, Aug. 1, 2005, www-128.ibm.com/developerworks/power/cell/, pp. 1-257.

* cited by examiner

```
extern FILE * fopen(const char *path, const char *mode);
# Position independent fopen assisted call
            .extern errno    # assumed aligned on 3rd word element
            .text
            .align 2
            .global fopen
    fopen:
```

410
```
            # Place input parameters onto the stack to form the local store
            # memory image.
            stqd    $3, -48($sp)
            stqd    $4, -32($sp)
```

420
```
            # Construct a message consisting of the 8-bit opcode and 24-bit
            # local store pointer to the input parameters and place it following
            # the stop and signal instruction.
            ila     $2, 0x3FFFF             # address mask
            ilhu    $3, FOPEN_CMD << 8
            ai      $4, $sp, -32            # parameter pointer
            selb    $3, $3, $4, $2          # combine command and address ptr
            cwd     $2, 4($sp)
            lqr     $4, stack_instr
            shufb   $3, $3, $4, $2          # insert msg into inst qword
```

430
```
            # Place stop, message, and return onto stack and then call it.
            ai      $4, $sp, -16
            stqd    $3, -16($sp)
            dsync
            bisl    $2, $4
```

440
```
            # Fetch return value from local store memory image and return in
            # R3. If the return value is 0, then store the return errno into the
            # local errno variable
            lqd     $3, -48($sp)
            lqa     $4, errno
            ceq     $5, $3, 0
            rotqmbyi $5, $5, -12
            selb    $4, $4, $3, $5
            sqa     $4, errno
            bi      $0                      # return to caller
```

```
            # Quadword aligned instruction sequence whose message is edited
            # and copied to the local stack frame for execution so that the function
            # is re-entrant. The sequence includes a stop and signal instruction
            # used to notify the PPE to perform the assisted call identified by the
            # opcode contained in the following message word.
            .align  4
    stack_instr:
            stop    0x2100
            .word   0                       # message
            nop     $0
            bi      $2
```

METHOD FOR PERFORMING EXTERNALLY ASSISTED CALLS IN A HETEROGENEOUS PROCESSING COMPLEX

BACKGROUND

1. Technical Field

The present application relates generally to an improved data processing system and method. More specifically, the present application is directed to an apparatus and method for performing externally assisted calls in a heterogeneous processing complex.

2. Description of Related Art

The Cell Broadband Engine architecture (CBEA), available from International Business Machines, Inc. of Armonk, N.Y., comprises a power processing element (PPE), which serves as a control plane processor, and multiple synergistic processing elements (SPEs) that serve as data plane processors. The SPEs are designed to execute small, high computation, software kernels. The SPEs have local storage devices that are locally addressable and have local limited protection mechanisms, e.g., an isolation mode of operation. That is, the local limited protection mechanisms make the local store fully protectable from outside processing elements and input/output (I/O) devices while the local SPE may freely read, write, and execute anywhere within its own the local store. These limited protection mechanisms and local addressability dictate that the operating system run on the PPE instead of the SPEs.

Without an operating system running on the SPEs, application developers do not readily have access to supervisory and device driver services programmers have come to expect. For example, file I/O services (e.g., printf, fopen, fread, etc.), shared memory access (e.g., shmat), memory mapping services (e.g., mmap), and I/O control (ioctl) services are among the services that are not readily available to applications running on SPEs in the data plane because the operating system, which provides these services, runs on the PPE in the control plane.

SUMMARY

In one illustrative embodiment, a method is provided for implementation in a data processing system having a control plane processor and one or more data plane processors. The method comprises processing, in a data plane processor of the data processing system, an instruction requiring external assistance by a function or service that is not available in the data plane processor but is available on the control plane processor. The method further comprises generating, in the data plane processor, an assisted call message for requesting assistance from the control plane processor. Moreover, the method comprises signaling the control plane processor to process the assisted call message and receiving, in the data plane processor, one or more return values from the control plane processor. The one or more return values are generated based on the control plane processor executing the function or service based on the assisted call message. Furthermore, the method comprises generating a parameter area in a local store associated with the data plane processor, copying input parameter data from one or more data registers of the data plane processor to the parameter area, and inserting a stop-and-signal instruction in an execution stack associated with the data plane processor based on the parameter area.

Additionally, the method comprises executing, in the data plane processor, the stop-and-signal instruction. The stop-and-signal instruction causes execution of instructions by the data plane processor to stop and initiates the signaling of the control plane processor to process the assisted call message.

In addition to the above, the method comprises inserting the assisted call message into the execution stack immediately following the stop-and-signal instruction, and modifying a value of a next program counter associated with the data plane processor, in response to executing the stop-and-signal instruction, to point to a location in the execution stack following the assisted call message. Further, the method comprises fetching the one or more return values from the parameter area, writing the one or more return values to one or more return data registers associated with the data plane processor, and restarting execution of instructions of the data plane processor at an instruction in the execution stack pointed to by the modified value of the next program counter.

These and other features and advantages of the present invention will be described in, or will become apparent to those of ordinary skill in the art in view of, the following detailed description of the exemplary embodiments illustrative of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary diagram of code for implementing a data plane processor fopen assisted call in accordance with one exemplary embodiment illustrative of the present invention;

DETAILED DESCRIPTION OF THE PREFERRED EMBODIMENTS

The illustrative embodiments provide mechanisms for performing assisted calls to operating system services in a multi-processor system. The mechanisms of the illustrative embodiments may be implemented in any multi-processor system in which applications or instructions executing on a first processor needs to access services available from a second processor in the multi-processor system, e.g., from an operating system executing on a different processor from the processor on which the instruction or application is executing. One such multi-processor system in which the exemplary aspects of the illustrative embodiments may be implemented is the Cell Broadband Engine architecture (CBEA) multi-processor system-on-a-chip, available from International Business Machines, Inc. of Armonk, N.Y. While the CBEA system-on-a-chip will be used to describe the preferred embodiments illustrative of the present invention, the present invention is not limited to such.

Figure 1:
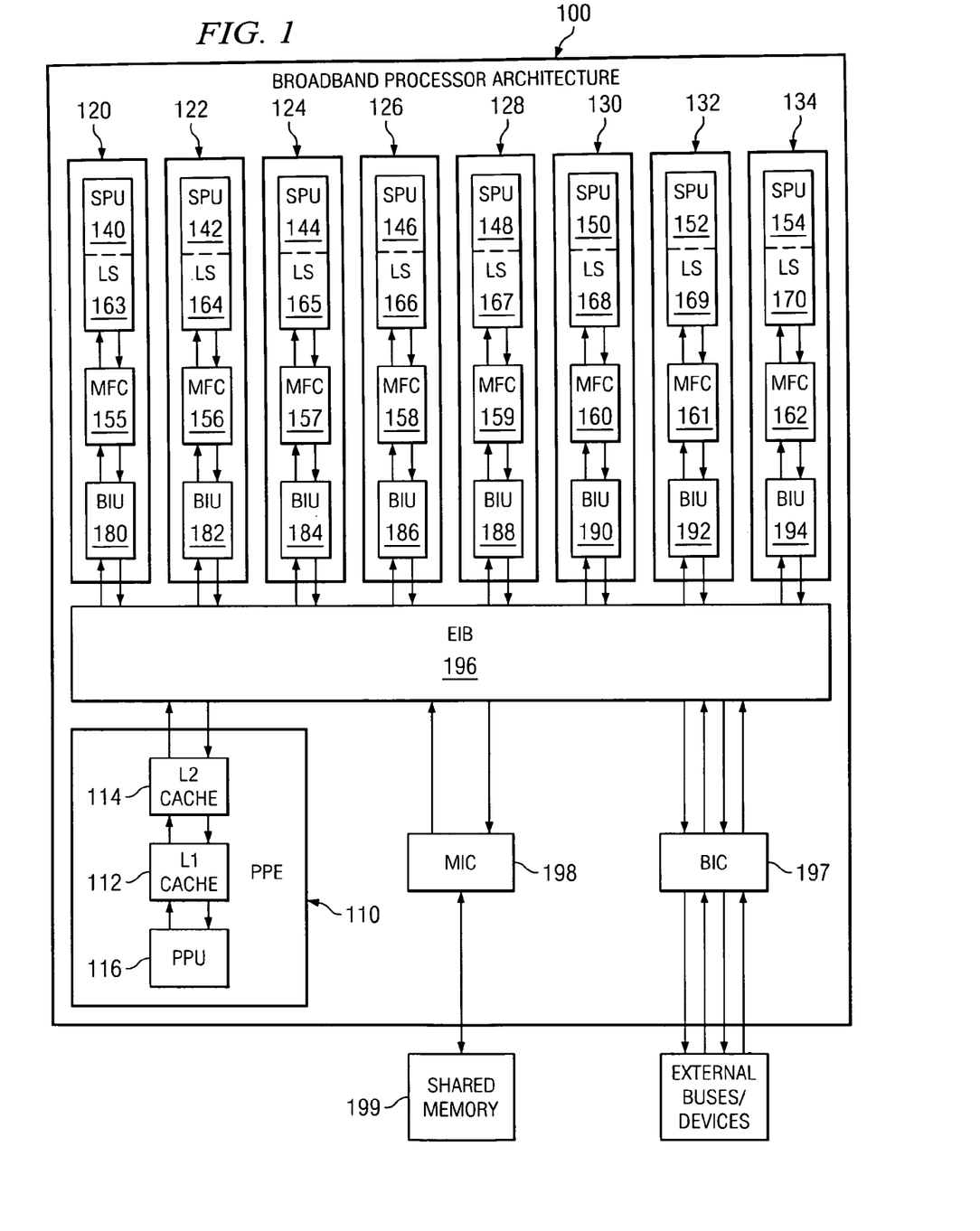
FIG. 1 is an exemplary block diagram of a Cell Broadband Engine architecture (CBEA) in accordance with one exemplary embodiment illustrative of the present invention.

FIG. 1 is an exemplary block diagram of a data processing system in which aspects of the illustrative embodiments of the present invention may be implemented. The exemplary data processing system shown in FIG. 1 is an example of a Cell Broadband Engine architecture (CBEA) data processing system. While the CBEA will be used in the description of the preferred embodiments illustrative of the present invention, the present invention is not limited to such, as will be readily apparent to those of ordinary skill in the art upon reading the following description.

As shown in FIG. 1, the CBEA 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBEA 100 may be a system-on-a-chip such that each of the elements depicted in FIG. 1 may be provided on a single microprocessor chip. Moreover, the CBEA 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBEA 100 and other external buses and devices.

The PPE 110 is a dual threaded PPE 110. The combination of this dual threaded PPE 110 and the eight SPEs 120-134 makes the CBEA 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBEA 100 may load programs for reading a DVD, video and audio decoding, and display, and the data would be passed off from SPE to SPE until it finally ended up on the output display. At 4GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The illustrative embodiments provide mechanisms for performing externally assisted calls. In a preferred embodiment, a mechanism according to an illustrative embodiment of the present invention is implemented in a multi-processor integrated circuit device, such as the system-on-a-chip described above with regard to FIG. 1. In this preferred embodiment, the mechanisms of the illustrative embodiment make use of facilities provided in the Cell Broadband Engine architecture. These facilities are described in the "Cell Broadband Engine Architecture V1.0" and "Synergistic Processor Unit (SPU) Instruction Set Architecture V1.0" documents available from International Business Machines, Inc. on the DeveloperWorks website at www-128.ibm.com/developerworks/power/cell/, which are hereby incorporated by reference.

In particular, the mechanisms of the illustrative embodiment make use of SPU registers including the SPU state register, the SPU next program counter (NPC) register, SPU data registers, etc., and the SPU stop-and-signal command instruction facilities, among others, provided in the Cell Broadband Engine architecture. The SPU Next Program Counter (NPC) register contains the address from which an SPU starts executing. When the SPU is in a stopped state, a read of this register returns the local storage address of the next instruction to be executed if the SPU is started without an intervening write to this register. In addition, the least significant bit of the data returned indicates the current SPU stopped interrupt enable/disable state, as well as the starting interrupt enable/disable state if the SPU is restarted without an intervening write to this register.

When the SPU has stopped execution, the hardware automatically updates the value in this register with the address of the next instruction to be executed and with the current SPU interrupt enabled or disabled state if execution is to be resumed with an SPU start command. The SPU can be stopped either by the execution of SPU conditional halt instructions, by an SPU error, by the execution of an SPU stop-and-signal instruction, by the execution of a single instruction step, or by resetting the RUN control bit in the SPU Run-Control Register. If the stop was due to a stop-and-signal instruction, the location of the actual stop-and-signal instruction can be determined by masking the enable or disable interrupt state bit, i.e. the least significant bit, then subtracting four from the value read from this register.

To resume execution at a different point in the program or if a new program is loaded into the SPU, the SPU next program counter register is written by software to set the SPU next program counter to the address in local storage of the next instruction to be executed, and the initial interrupt enable or disable state to be effective when the SPU is started.

The SPU stop-and-signal command instruction stops the SPU's execution and signals the external environment, i.e. the operating system running on the control plane processor, of the stopping of the SPU. In addition, the stop-and-signal command instruction provides information regarding the state of the SPU at the time of the stopping of the SPU. The stop-and-signal command has a stop type that, in the illustrative embodiments of the present invention, identifies the stop-and-signal command as being associated with an assisted call and a particular standardized assisted call library class. Based on this stop type, the control plane processor may determine which assisted call handler needs to be invoked for providing assisted call handling of a SPU instruction.

The illustrative embodiment uses these registers, the stop-and-signal command instruction, and an assisted call handler to provide external assistance to a data plane processor, e.g., an SPU or SPE, in executing instructions and/or processing data. In particular, when an execution of an instruction or the processing of data requires an operating system service, e.g., the instruction is an fopen, fread, printf, etc. instruction, the mechanisms of the illustrative embodiment generate an input/output (I/O) memory image for passing input/output parameters for the instruction. This I/O memory image is used to insert a stop-and-signal instruction in the data plane processor's stack and an assisted call message after the stop-and-signal instruction in-the stack. The stop-and-signal instruction causes the data plane processor to stop execution and signal the control plane processor of the stop state of the data plane processor. The control plane processor retrieves the assisted call message, identifies a library or service to provide the external assistance requested, performs the library function or service, and stores return values in the I/O memory image. The control processor then restarts the data plane processor at the instruction following the assisted call message.

Figure 2A:
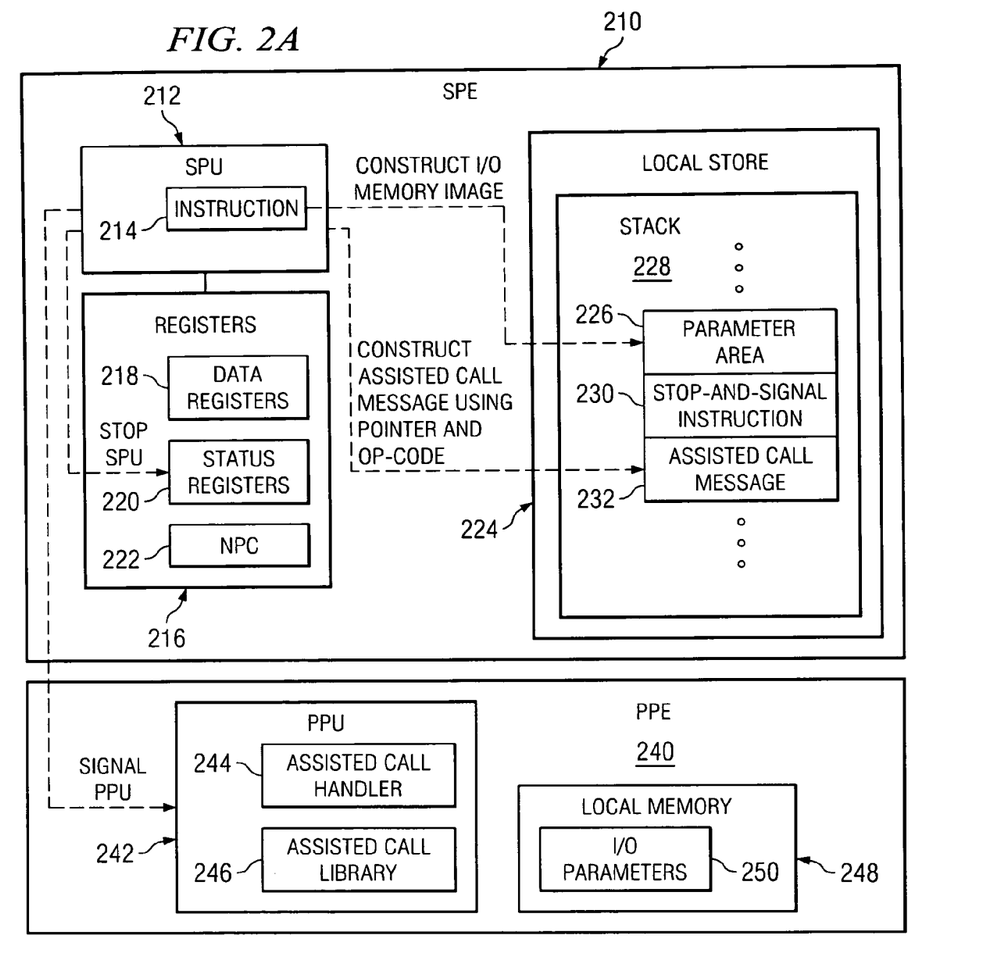
FIGS. 2A-2C are exemplary block diagrams illustrating an interaction of the primary operational components of one exemplary embodiment illustrative of the present invention when performing externally assisted call processing.
Figure 2B:
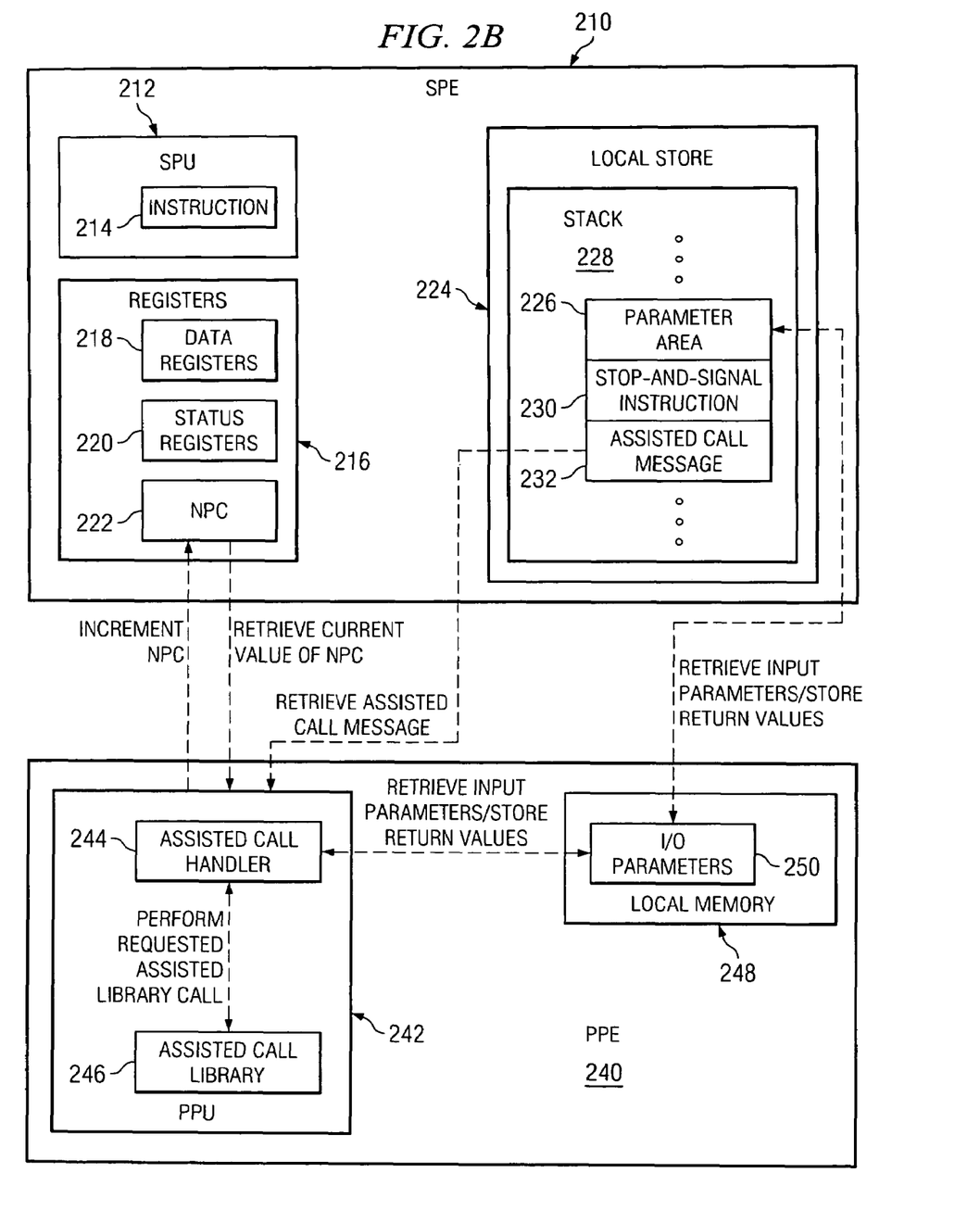
Figure 2C:
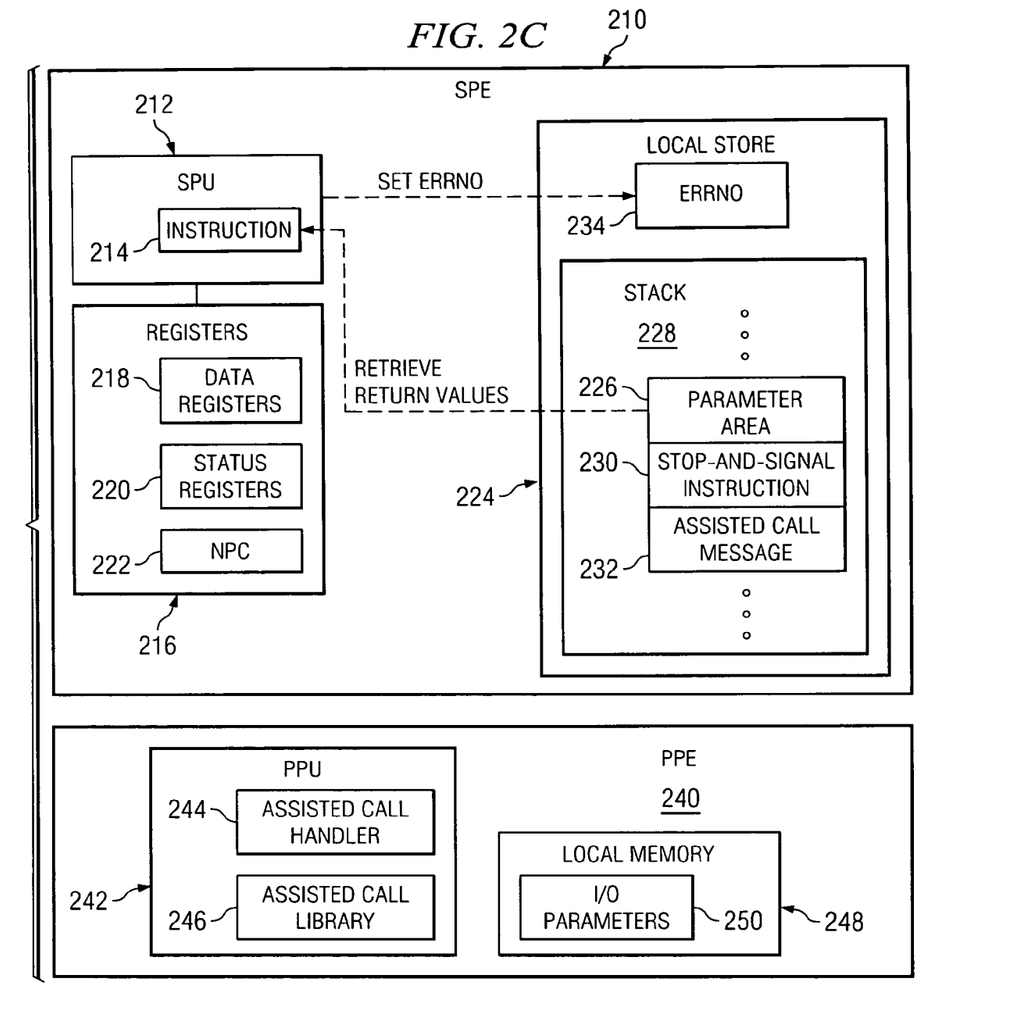

FIGS. 2A-2C are exemplary block diagrams illustrating an interaction of the primary operational components of one exemplary embodiment illustrative of the present invention when performing externally assisted call processing. With the mechanisms of the illustrative embodiment, functions that cannot be fully serviced by a data plane processor, i.e. a processor whose function is to process data and instructions under the control of a control processor, may make use of the control processor in a control plane to assist in the execution of the function or instruction by providing operating system libraries or services of an operating system running on the control processor. For example, a synergistic processing unit (SPU) of a synergistic processing element (SPE) may receive assistance from operating system libraries and/or services of an operating system running on a power processing unit (PPU) in a power processing element (PPE).

Whether or not a particular function requires assistance from the control plane processor is predetermined by the author of the library function or service being invoked and for which assistance is required. Generally, the choice on whether a function or service is assisted is based upon the data plane processor's ability to perform the function which is often predicated by the fact that the operating system is run on the control plane processor. However, it may also be predicated on the complexity and performance requirements of the function or service.

For example, consider the sscanf function. To implement this function may require approximately 80K of code and its performance is not critical to the application. Therefore, it may be easier to offload the implementation of the sscanf function to the control plane processor by using the assistance mechanisms of the exemplary embodiment and not incur the additional 80K of data plane processor code, i.e. consume a significant amount of the limited local store resource.

Having developed library functions and/or services that require control plane processor assistance, when an instruction is executed by the data plane processor that includes a call of these library functions and/or services, a determination is made that the call requires external assistance from the control plane processor. This determination may be made, for example, by determining that the particular library function and/or service is not presently loaded by the data plane processor, looking at a path of the library function and/or service called, or any other mechanism for determining that the required library function and/or service is present at the control plane processor.

As shown in FIG. 2A, with the mechanisms of the illustrative embodiment, in order to perform an assisted call, a data plane processor, e.g., SPU 212, first constructs a memory mapped parameter area 226 as the union of the input and output parameters for the function or instruction 214 that requires control processor assistance. This memory mapped parameter area 226 may be stored, for example, in the local storage 224 associated with the data plane processor 212. The current data values for the input parameters are copied from data registers 218 in the data plane registers 216 or from the data plane processor stack 228 into the memory mapped parameter area 226. When the data registers 218 are full, data may be stored in the data plane processor stack 228. Thus, the current data values may be obtained from either or both of the data plane processor registers 216 or stack 228.

The SPU 212 generates an assisted call message 232 based on a combination of a pointer to the parameter area 226 in the local storage 224 and a specific library or operating system (OS) service function opcode for the assisted call library or OS service function that is being called. The assisted call message 232 is placed into the data plane processor's stack 228 immediately following a stop-and-signal instruction 230.

The signal type of the stop-and-signal instruction 230 is chosen according to a classification of the assisted call library or OS service function being called, i.e. based on the library or OS service function opcode. The assisted call library or OS service calls are classified according to the standard in which they are specified. Each assisted call library or OS service call is assigned a unique stop-and-signal type. That is, each standard is assigned a unique stop and signal type, but within each standard, each assisted call library or service is assigned a unique opcode.

The opcodes for each assisted call library or OS service class are assigned and registered with the operating system running on the control plane processor and are registered with the data plane processors as well. This registration may be a specification registration process that allocates stop and signal types and opcodes as requested by the programmer. The registry exists as a administration process to ensure that stop and signal types, as well as opcodes are uniquely assigned and do not conflict with each other for a given operating environment. For example, the registry may be something as simple as a shared header file containing the allocated (assigned) stop and signal types and opcodes. Alternatively, the registry may be a formalized process in which programmers formally request stop and signal types and opcodes from a specific gatekeeper or manager.

A runtime registration process may also be possible, although not preferred. The registry in a runtime registration implementation would require a local store structure that would consume valuable local storage space. Instead, the stop and signal type and opcode, preferably are encoded in the SPE library function based upon pre-assigned values.

Thus, the signal type of the stop-and-signal instruction 230 identifies the assisted call library or service that is being requested to provide assistance to the SPE in processing the instruction. In a runtime registration implementation, a data structure may be maintained in the SPE, e.g., in the local store 224, for mapping the assisted call library or OS service opcode to a signal type. This data structure may be used when constructing the stop-and-signal instruction 230 and inserting the stop-and-signal instruction 230 in the stack 228. Alternatively, in a preferred embodiment, the stop and signal type and opcode are encoded in the SPE library function based upon pre-assigned values and thus, do not require a separate data structure present in the local store 224.

When the data plane processor, i.e. SPU 212, executes the stop-and-signal instruction 230, the SPU 212 places itself in a stopped state by updating a SPU status register 220 to identify the SPU 212 as being in a stopped state. The SPU 212 also signals the external environment, i.e. PPE 240, of the stopped state of the SPU 212.

As shown in FIG. 2B, in response to receiving the signal from the SPE 212 that the SPE 212 is in a stopped state, the PPU 242 of the PPE 240 retrieves the assisted call message 232 from the local store word in the stack 228 pointed to by the data plane processor's next program counter (NPC) 222. The least significant bit (interrupt enable bit) of the next program counter 222 is stripped off when determining the address of the assisted call message 232. The next program counter 222 of the SPE 210 is then incremented by the PPU 242 to point to a next local store word after then assisted call message 232.

The PPU 242 then hands control over to an assisted call handler 244 running on the PPU 242 based upon the stop-and-signal instruction 230 signal type and the opcode in the assisted call message 232. The assisted call handler 244 identifies the assisted call library or OS service 246 that is required to provide assisted processing to the SPU 212. The assisted call input parameters from the memory mapped parameter area 226 are then retrieved based on the pointer contained within the assisted call message 232 and are stored in the local memory 248 of the PPE 240. The requested assisted library call or OS service 246 is then executed under the control of the assisted call handler 244.

The assisted library call or OS service 246 generates return values that are to be returned to the SPE 210 for use by the SPU 212 in processing the instruction 214. All return values are placed into the memory mapped parameter area 226 pointed to by the pointer contained within the assisted call message 232. These values may be temporarily stored in the I/O parameters 250 of the local memory 248. The return values may be provided in a quad-word return value, for example.

Alternatively, the assisted call handler 244 running on the PPU 242 may pull I/O parameters directly from the memory mapped parameter area 226 in the local store 224 without an intermediate copy of the I/O parameters 250. This extra level of indirection by having the intermediate copy of the I/O parameters 250 may be used, for example, in cases where the PPU 242 needs to reformat the parameters before making a assisted call library 246 or service call, if memory mapped I/O access to the local store 224 is not supported, or the like.

In a preferred embodiment, assisted calls that generate errors that set an "errno," i.e. an identifier of a reason for an encountered error, return the value of the "errno" in a location of the return value quad-word that avoids any conflict with other return values. For example, in one exemplary embodiment, the errno value may be provided in a third word element of the quad-word return value. This errno value may be used by the SPU 212 when handling errors in the processing of instruction 214.

After the processing by the assisted call library or OS service is completed, the PPU 242 may restart the SPU 212.

The SPE 212 resumes execution at the modified (incremented) next program counter such that the SPE 212 resumes execution at the instruction following the assisted call message 232.

As shown in FIG. 2C, to complete the assisted call, the SPU 212 fetches the return values from the parameter area 226 and places them into return data registers in the data registers 218. The SPU 212 may then continue execution of the instruction 214 and processing of additional instructions/data in a normal fashion. If the assisted call set an errno, the errno value may be stored in an errno variable location 234 in the local storage 224 of the SPE 210. An error handler (not shown) may then be invoked to handle the error based on the errno value stored in the local storage 224.

As mentioned previously, in an illustrative embodiment of the present invention, the errno value may be provided, for example, in a third word element of a quad-word return value. The entries in the I/O memory image are the union of the input and output parameters for a particular assisted call message. For example, for an fopen assisted call, i.e. FILE *fopen (const char *path, const char *mode), there are two inputs that are 32 bit local store pointers "path" and "mode" and one output that is a 32 bit local store pointer of type "FILE."

Figure 3A:
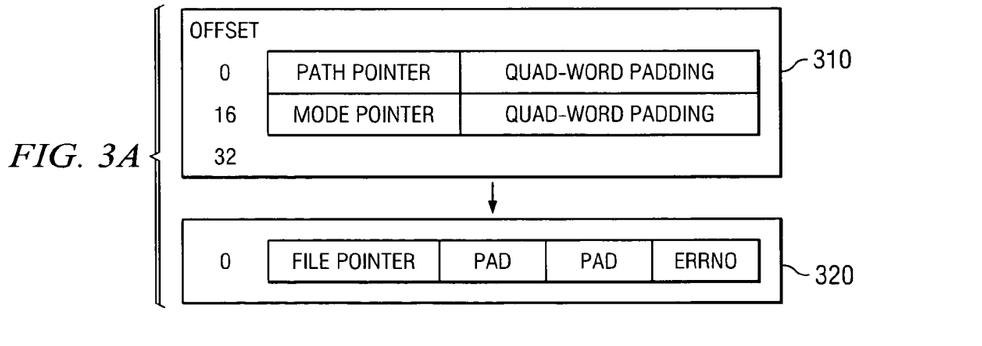
FIG. 3A is an exemplary diagram of an I/O memory image in accordance with one exemplary embodiment illustrative of the present invention.

The memory image for the input parameters is shown in FIG. 3A as memory image 310. As shown in FIG. 3A, the "path" pointer is provided in a first quad-word entry at offset 0. The "mode" pointer is provided in a second quad-word entry at offset 16.

The output values that are returned to SPE 210 by the PPU 242 are returned in the same memory image in which the inputs were found. In FIG. 3A, these output, or return, values are shown as memory image 320. As shown, the return value, i.e. "FILE" pointer, is stored as a quad-word entry in the I/O memory image at offset 0. This quad-word entry has a third word element that may store the errno value, if any, returned by the called assisted call library or service.

Figure 3B:
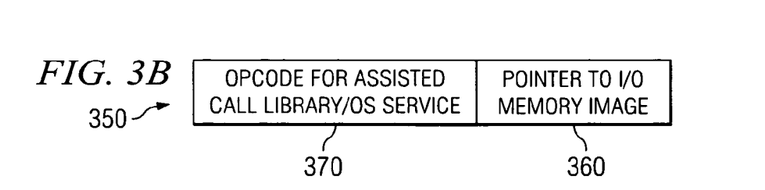
FIG. 3B is an exemplary diagram of an assisted call message in accordance with one exemplary embodiment illustrative of the present invention.

FIG. 3B is an exemplary diagram of an assisted call message in accordance with one exemplary embodiment illustrative of the present invention. As shown in FIG. 3B, the assisted call message 350 includes a pointer 360 to, or address of, the I/O memory image created for the assisted call. In addition, the assisted call message 350 includes an opcode or other identifier 370 of the assisted call library or OS service that is required to provide assistance in the processing of the instruction or data by data plane processor, e.g., the SPU 212. As mentioned above, the opcode or identifier 370 of the assisted call library or OS service is used by the control plane processor, e.g., the PPU 242, to hand control over to an appropriate assisted call handler that executes an appropriate assisted call library or OS service. The pointer 360 is used by the control plane processor, e.g., the PPU 242, to retrieve the input/output parameters for use by the assisted call library/OS service that is to provide assistance to the processing of the instruction/data in the data plane processor.

FIG. 4 is an exemplary diagram of code for implementing a data plane processor fopen assisted call in accordance with one exemplary embodiment illustrative of the present invention. The exemplary code shown in FIG. 4 is code that may be executed by a data plane processor, e.g., SPU 212, when executing a fopen C99 function call which requires assistance of the control plane processor. As shown in FIG. 4, a first portion 410 of the exemplary code is used to place input parameters into an I/O memory image. In this particular example, the input parameters are placed on the stack associated with the data plane processor in order to form the I/O memory image.

A second portion 420 of the exemplary code is used to construct the assisted call message based on the opcode and local store pointer to the I/O memory image. A third portion 430 of the exemplary code is used to notify the PPE to perform the assisted call request by issuing a stop-and-signal instruction with a signal code or signal type corresponding to the fopen instruction, i.e. 0x2100.

A fourth portion 440 of the exemplary code is used to fetch the return values from the I/O memory image and store these return values in the return register, i.e. R3. If the return value is a 0, then an error was encountered and the return errno value is stored into the local errno variable. The exemplary code then returns to the caller instruction.

As mentioned above, the assisted call library or OS service calls may be classified according to the standard in which they are specified. Each assisted call library or OS service class may have its own uniquely assigned stop-and-start signal type. Furthermore, for each standard, individual library functions or services are provided with their own unique opcodes. The following table illustrates exemplary assisted call library stop signal types and their corresponding standard:

TABLE 1

Assisted Call Library Stop Type and Standard

| Stop Type | Standard |
|---|---|
| 0x2100 | ISO/IEC C Standard 9899:1999 (c99) |
| 0x2101 | POSIX.1 (IEEE Std 1003.1) |
| 0x2102 | POSIX.4 |
| 0x2103 | OS dependent system calls |

The exemplary embodiments illustrative of the present invention described above make use of an I/O memory image in the local store as a means by which the control plane processor accesses the input/output data values for the functions that requires external assistance by the control plane processor. The parameters, e.g., pointers, passed within the I/O memory image may use local store or system memory pointers. The opcode registry in the operating system executing on the control plane processor specifies the type of pointer for each opcode that contains pointer parameters. Thus, it is possible that two versions of the assisted calls may be provided—one with local store pointer parameters (32 bits, for example), and another with effective address pointer parameters (64 bits, for example).

Since assisted library or OS service calls introduce data within the data plane processor's instruction sequence, i.e. data and instructions are inserted into the data plane processor's stack, special accommodations are made within debuggers in order to successfully perform signal stepping, i.e. stepping to a next instruction in the stack. Debugger single stepping is typically implemented by replacing the "next instruction" with a stopd instruction. The "next instruction" depends upon the current instruction and the state of the registers.

For example, if the current instruction is the conditional branch instruction, brz, then the next instruction can be either the next sequential instruction (NPC+4) or the instruction of the branch target address specified by the instruction, depending upon the value of the specified register. As such, debuggers must be aware of the current instruction in order to determine the next instruction in which to place the next stopd instruction.

Externally assisted library or OS service calls introduce additional instructions/data for which debuggers must be aware in order to correctly predict the next instruction. If the current instruction is a stop-and-signal instruction with a signal type indicative of an assisted call, e.g., a signal type of 0x2100 through 0x21FF, then the next instruction may be determined to be the next program counter (NPC) value+8, not the next sequential instruction NPC+4. In other words, the next program counter (NPC) value is incremented by the control plane processor to point to the next instruction (NPC+8) after the assisted call message (which would be at NPC+4) in the stack.

The illustrative embodiments provide a standardized mechanism for requesting assistance from a control plane processor in servicing instructions/functions that cannot be serviced directly by the data plane processor. The solution provided by the illustrative embodiments is easily extendable to support a wide variety of instructions/functions including both system calls and application defined functions. The mechanism of the present moves the complexity of servicing the assisted call to the control plane processor so that the data plane process's local storage utilization is minimized.

By providing a mechanism for obtaining external assistance of library function/service calls from a control plane processor, the illustrative embodiments of the present invention allows the code of the library functions/services to execute on the control plane processor rather than on the data plane processor. As a result, the local storage of the data plane processor need not be used to store the code of the library functions/services.

For example, consider a sprintf function (ie, a formatted print to a string). The data plane processor could parse the format string and construct a final output string. Doing this, however, would require approximately 70K of code stored in the local storage of the data plane processor. Instead, with the mechanisms of the illustrative embodiments of the present invention, the data plane processor passes all the parameters to the control plane processor which performs the sprintf and copies the resulting string back to the data plane processor's local store. Having the control plane processor manage all the complexity reduces the data plane processor's code to approximately less than 100 bytes.

Figure 5:
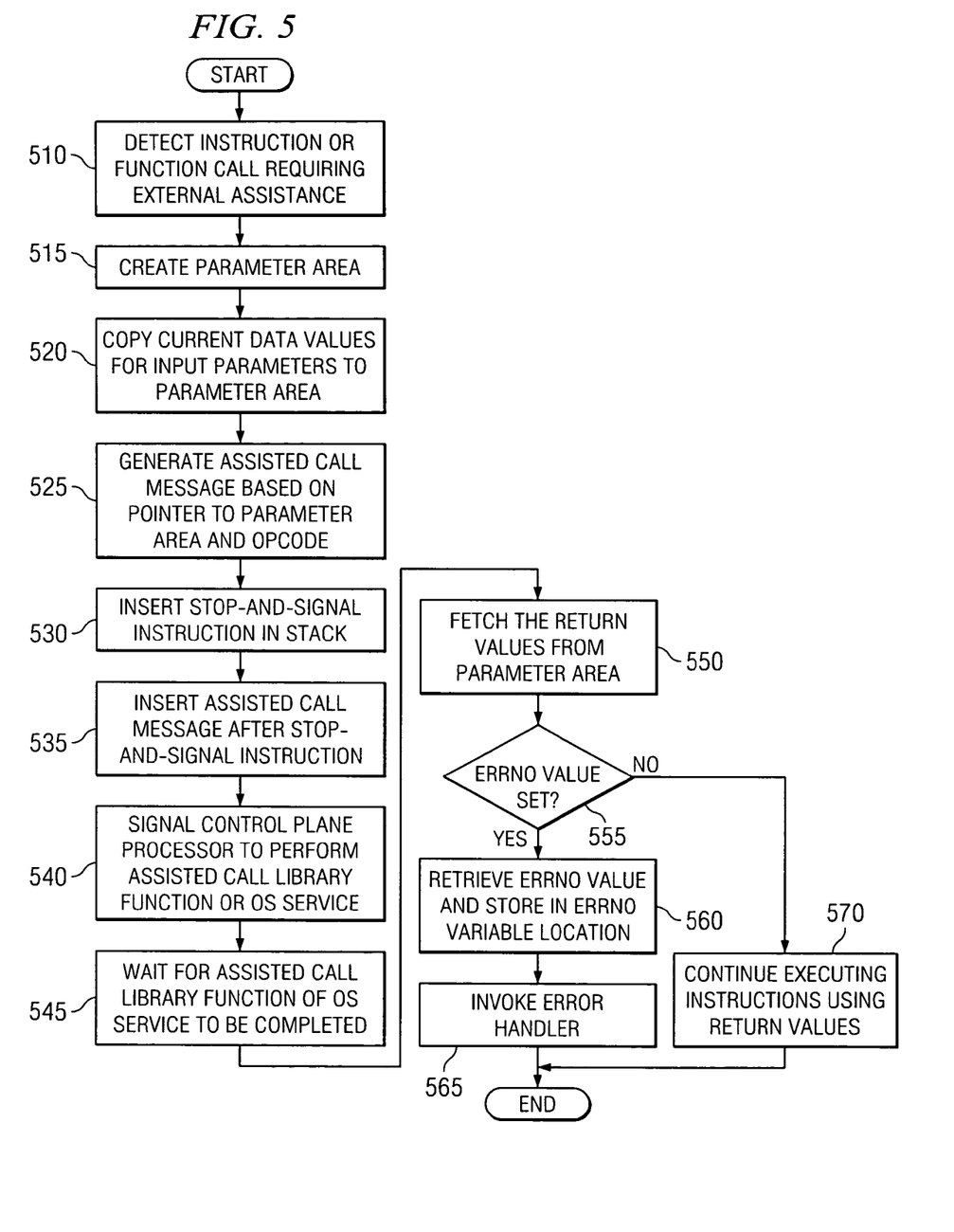
FIG. 5 is a flowchart outlining an exemplary operation of a data plane processor in accordance with one exemplary embodiment illustrative of the present invention.
Figure 6:
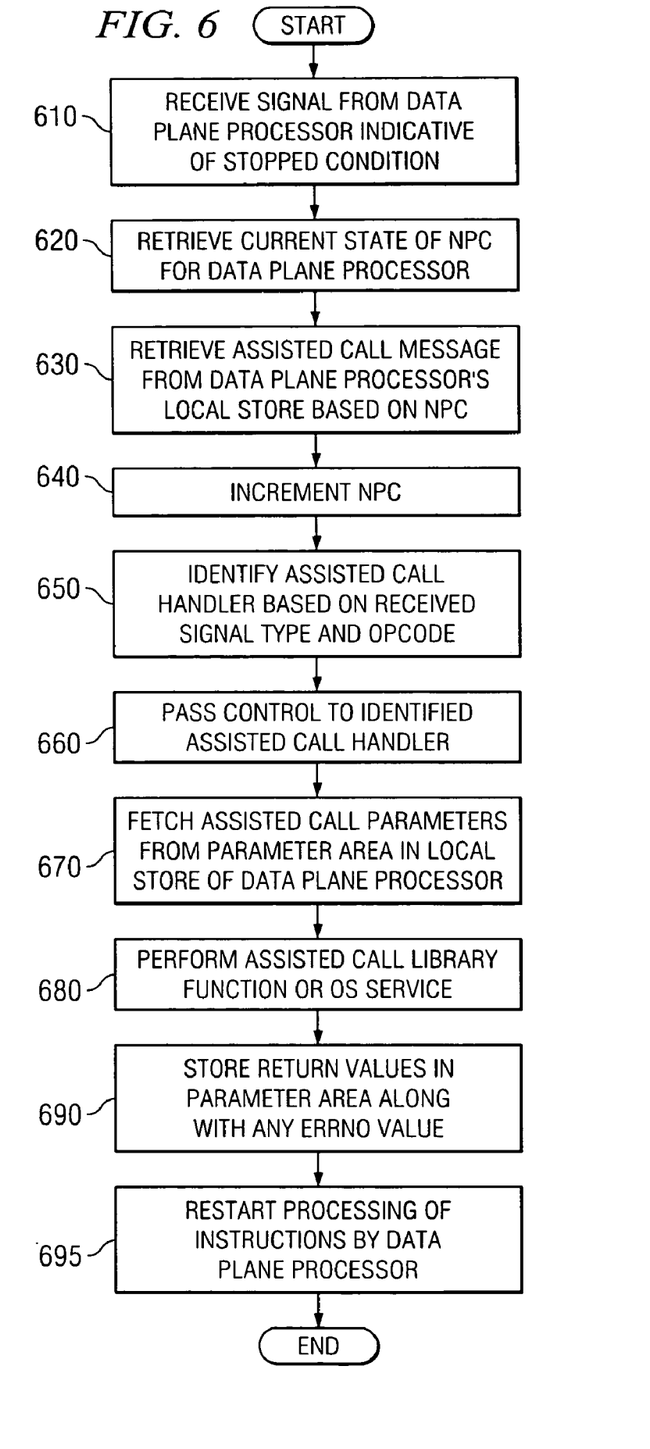
FIG. 6 is a flowchart outlining an exemplary operation of a control plane processor in accordance with one exemplary embodiment illustrative of the present invention.

FIGS. 5 and 6 are flowcharts that illustrate an exemplary operation according to an exemplary embodiment illustrative of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 5 is a flowchart outlining an exemplary operation of a data plane processor in accordance with one exemplary embodiment illustrative of the present invention. As shown in FIG. 5, the operation starts by the data plane processor detecting an instruction or function call that requires external assistance by a control plane processor (step 510). The data plane processor creates a memory mapped parameter area as the union of the input and output parameters of the instruction or function call (step 515). The data plane processor copies the current data values for the input parameters from registers or the stack into the memory mapped parameter area (step 520).

The data plane processor generates an assisted call message by combining a pointer to the memory mapped parameter area with a specific assisted call library or OS service opcode for the particular assisted call library or OS service required to complete execution of the instruction or function call (step 525). The data plane processor inserts a stop-and-signal instruction, having a signal type chosen according to the classification of the assisted call library or OS service, into the stack in a local store (step 530). The data plane processor inserts the assisted call message into the stack in the local store immediately following the stop-and-signal instruction (step 535). The data plane processor then signals the control plane processor to perform the assisted call library function or OS service on behalf of the data plane processor by executing the stop-and-signal instruction (step 540).

The data plane processor then waits for the assisted call library function or OS service to complete and return values to become available, e.g., restarting the data plane processor at the next program counter (step 545). The data plane processor, in response to the library function or OS service being completed, fetches the return values from the memory mapped parameter area and places them into return registers of the data plane processor (step 550).

The data plane processor determines if an errno value has been set (step 555). If so, then the data plane processor retrieves the errno value and stores the errno value in an errno variable location in the local store (step 560). The data plane processor may then invoke an error handler to handle the error (step 565). Otherwise, if an errno value has not been set, the data plane processor continues executing instructions using the return values obtained from the control plane processor (step 570). The operation then terminates.

FIG. 6 is a flowchart outlining an exemplary operation of a control plane processor in accordance with one exemplary embodiment illustrative of the present invention. As shown in FIG. 6, the operation starts by the control plane processor receiving a signal from a data plane processor indicative of a stopped condition of the data plane processor (step 610). The control plane processor retrieves the current state of the data plane processor's next program counter (step 620) and retrieves an assisted call message from the data plane processor's local store based on the current state of the next program counter (step 630). The control plane processor increments the next program counter of the data plane processor to point to a next instruction after the assisted call message in the stack in the data plane processor's local store (step 640).

The control plane processor identifies an appropriate assisted call handler based on the stop-and-signal instruction signal type received in the signal from the data plane processor and the opcode specified in the assisted call message (step 650). The control plane processor then passes control to the identified assisted call handler (step 660). The assisted call handler fetches the assisted call parameters from the memory mapped parameter area pointed to by the pointer contained in the assisted call message (step 670) and performs the requested assisted call library function or OS service using these parameters (step 680). The assisted call handler generates return values based on the execution of the assisted call library function or OS service and stores them in the memory mapped parameter area along with any errno values generated, if any (step 690). The control plane processor then restarts the execution of instructions by the data plane processor (step 695) and the operation terminates.

Thus, the illustrative embodiments provide a standardized mechanism for permitting a data plane processor to access library functions and operating system services on a control plane processor. The illustrative embodiments further provide an easily extendable mechanism for passing information between the data plane processor and the control plane process so as to facilitate the use of operating system provided functions in a processor that does not run the operating system. The mechanisms of the illustrative embodiments move the complexity of servicing the assisted calls to the control plane processor so that the data plane processor local store utilization is minimized.

The above description of the illustrative embodiments has been provided assuming that requests for external assistance are associated with operating system library functions or services. However, the present invention is not limited to such. Rather, the requests that may make use of external assistance using the mechanisms of the illustrative embodiments of the present invention may be any request that cannot (or has been elected to not) be serviced within the data plane processor, e.g., the SPU. For example, a programmer may want to implement a standardized math library on a data plane processor. To conform to a standard, the programmer may implement, for example, a cube root function. The programmer may know that the cube root function is not critical to the customer base. Therefore, instead of spending time developing the cube root function for the data plane processor, e.g., the SPU, the programmer may implement that function as an assisted function and use the cube root function already provided by and implemented on the control plane processor, e.g., the PPU.

It is important to note that while the illustrative embodiments have been described in the context of a fully functioning data processing system, those of ordinary skill in the art will appreciate that the processes of the illustrative embodiments are capable of being provided in either an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact diskread only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in data processing system having a control plane processor and one or more data plane processors, comprising:

processing, in a data plane processor of the data processing system, an instruction requiring external assistance by a function or service that is not available in the data plane processor but is available on the control plane processor;

generating, in the data plane processor, an assisted call message for requesting assistance from the control plane processor;

signaling the control plane processor to process the assisted call message;

receiving, in the data plane processor, one or more return values from the control plane processor, wherein the one or more return values are generated based on the control plane processor executing the function or service based on the assisted call message;

generating a parameter area in a local store associated with the data plane processor;

copying input parameter data from one or more data registers of the data plane processor to the parameter area;

inserting a stop-and-signal instruction in an execution stack associated with the data plane processor based on the parameter area;

executing, in the data plane processor, the stop-and-signal instruction, wherein the stop-and-signal instruction causes execution of instructions by the data plane processor to stop and initiates the signaling of the control plane processor to process the assisted call message;

inserting the assisted call message into the execution stack immediately following the stop-and-signal instruction;

modifying a value of a next program counter associated with the data plane processor, in response to executing the stop-and-signal instruction, to point to a location in the execution stack following the assisted call message;

fetching the one or more return values from the parameter area;

writing the one or more return values to one or more return data registers associated with the data plane processor; and restarting execution of instructions of the data plane processor at an instruction in the execution stack pointed to by the modified value of the next program counter.

\* \* \* \* \*